United States Patent
Choi et al.

(10) Patent No.: US 11,133,007 B2
(45) Date of Patent: Sep. 28, 2021

(54) SYSTEM AND METHOD FOR PROVIDING INFORMATION BASED ON SPEECH RECOGNITION

(71) Applicants: HYUNDAI MOTOR COMPANY, Seoul (KR); KIA MOTORS CORPORATION, Seoul (KR)

(72) Inventors: Jang Won Choi, Seoul (KR); Tae Hyun Sung, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 67 days.

(21) Appl. No.: 16/530,402

(22) Filed: Aug. 2, 2019

(65) Prior Publication Data

US 2020/0357394 A1    Nov. 12, 2020

(30) Foreign Application Priority Data

May 10, 2019   (KR) ......................... 10-2019-0055047

(51) Int. Cl.
| | |
|---|---|
| *G10L 15/22* | (2006.01) |
| *G10L 15/08* | (2006.01) |
| *G10L 15/30* | (2013.01) |
| *G01C 21/36* | (2006.01) |

(52) U.S. Cl.
CPC .......... *G10L 15/22* (2013.01); *G01C 21/3664* (2013.01); *G10L 15/08* (2013.01); *G10L 15/30* (2013.01); *G10L 2015/088* (2013.01); *G10L 2015/223* (2013.01); *G10L 2015/228* (2013.01)

(58) Field of Classification Search
USPC ............................. 704/246, 247, 251, 252
See application file for complete search history.

(56) References Cited

U.S. PATENT DOCUMENTS

| | | | |
|---|---|---|---|
| 2012/0229302 A1* | 9/2012 | Sri-Jayantha | G08G 1/0112 340/905 |
| 2018/0211663 A1* | 7/2018 | Shin | G10L 15/30 |
| 2019/0299850 A1* | 10/2019 | Dohan | G10L 15/22 |
| 2019/0378515 A1* | 12/2019 | Kim | G10L 17/22 |
| 2019/0392827 A1* | 12/2019 | Park | G10L 15/22 |

* cited by examiner

*Primary Examiner* — Leonard Saint Cyr

(57) ABSTRACT

A system and a method for providing information based on speech recognition are provided. The system for providing information based on speech recognition includes a vehicle, and a server that provides an automatic wake-up context of a speech recognition function based on driving environment information and vehicle information of the vehicle, receives speech information associated with the automatic wake-up context from the vehicle, and generates service information through processing of the received speech information to provide the service information to another vehicle, wherein the vehicle automatically obtains the speech information by using the speech recognition when the automatic wake-up context is uttered, and transmits the speech information to the server.

18 Claims, 4 Drawing Sheets

SYSTEM AND METHOD FOR PROVIDING INFORMATION BASED ON SPEECH RECOGNITION

CROSS-REFERENCE TO RELATED APPLICATION

The present application claims priority to and the benefit of Korean Patent Application No. 10-2019-0055047, filed on May 10, 2019, which is incorporated herein by reference in its entirety.

TECHNICAL FIELD

The present disclosure relates to a system and a method for providing information based on speech recognition.

BACKGROUND

The statements in this section merely provide background information related to the present disclosure and may not constitute prior art.

As speech recognition technology is applied to a vehicle, there has been studied a scheme of extracting, through filtering, meaningful information from speech information which is collected by using the speech recognition technology when the occupant in the vehicle utters information related to traffic or location and sharing the meaningful information with other vehicle drivers.

In conventional information sharing technology, the driver must perform a specific operation (e.g., pushing of a speech recognition button or a preset command utterance) to activate a speech recognition function in order to collect information that the occupant in the vehicle has uttered. However, such a scheme of activating a speech recognition function may cause an accident by distracting the driver's attention during driving.

Meanwhile, when the speech information is collected by automatically activating the speech recognition function in order to prevent the distraction of driver's attention during driving, information that is undesired to be collected, such as personal information, may be collected. As a result, there may be an increasing concern about privacy protection.

SUMMARY

An aspect of the present disclosure provides a system and a method for proving information based on speech recognition, which can collect information based on speech recognition without any specific operations of a user by changing context that automatically allows a speech recognition function to wake up based on vehicle driving environment information or vehicle information, and process the collected speech information to provide the information to another vehicle.

The technical problems to be solved by the present inventive concept are not limited to the aforementioned problems, and any other technical problems not mentioned herein will be clearly understood from the following description by those skilled in the art to which the present disclosure pertains.

In one form of the present disclosure, a system for providing information based on speech recognition includes a vehicle, and a server that provides an automatic wake-up context of a speech recognition function based on driving environment information and vehicle information of the vehicle, receives speech information associated with the automatic wake-up context from the vehicle, and generates service information through processing of the received speech information to provide the service information to another vehicle, wherein the vehicle automatically obtains the speech information by using the speech recognition when the automatic wake-up context is uttered, and transmits the speech information to the server.

The server may filter personal information from the speech information.

The server may generate the service information in consideration of at least one of a frequency number of utterances of the speech information and a weight corresponding to association with the automatic wake-up context.

In one form of the present disclosure, a vehicle includes a navigation device that provides driving environment information of the vehicle, a vehicle information detector that provides vehicle information, a speech recognizer that recognizes speech information in the vehicle, and a processor that obtains speech information associated with an automatic wake-up context that is changed corresponding to the driving environment information and the vehicle information.

The processor may determine whether to activate the speech recognizer based on at least one of the driving environment information and the vehicle information.

The processor may activate the speech recognizer when the driving environment information is mismatched with the vehicle information.

The vehicle may further include a communication device that communicates with a server, wherein the processor requests the automatic wake-up context from the server and receive the automatic wake-up context.

The processor may determine whether the automatic wake-up context is uttered through the speech recognizer after the speech recognizer is activated.

The processor may obtain the speech information after a point in time when the automatic wake-up context is uttered and to transmit the speech information to the server.

The vehicle may further include storage that stores the automatic wake-up context based on the driving environment information and the vehicle information.

In another form of the present disclosure, a method of providing information based on speech recognition includes obtaining, by a vehicle, driving environment information and vehicle information, obtaining, by the vehicle, speech information associated with an automatic wake-up context of a speech recognition function based on the driving environment information and the vehicle information, transmitting, by the vehicle, the speech information to a server, and generating, by the server, service information through processing of the speech information to provide the service information to another vehicle.

The obtaining of the driving environment information and the vehicle information may include obtaining, by the vehicle, the driving environment information including at least one of current location information, real-time road information and weather information through a navigation device, and obtaining, by the vehicle, the vehicle information including at least one of vehicle speed information and state information through sensors mounted on the vehicle.

The obtaining of the speech information may include determining, by the vehicle, activation of the speech recognition function based on the driving environment information and the vehicle information, sensing, by the vehicle, utterance of the automatic wake-up context after the speech recognition function is activated, and obtaining and storing, by the vehicle, speech information after a point in time when the automatic wake-up context is uttered.

The determining of the activation of the speech recognition function may include determining the activation of the speech recognition function when a road on which the vehicle travels is identified as a congested state based on the driving environment information.

The determining of the activation of the speech recognition function may include determining the activation of the speech recognition function when the vehicle is identified in a low-speed state or a stationary state based on the vehicle information.

The determining of the activation of the speech recognition function may include determining the activation of the speech recognition function when the driving environment information is mismatched with the vehicle information.

The method may further include, after the determining of the activation of the speech recognition function, requesting, by the vehicle, the automatic wake-up context from the server, and providing, by the server, the automatic wake-up context to the vehicle based on the driving environment information and the vehicle information.

The sensing of the utterance of the automatic wake-up context may include obtaining, by the vehicle, speech information uttered by a user aboard the vehicle to compare the speech information with the automatic wake-up context, and determining whether the automatic wake-up context is uttered based on the comparison result.

The generating of the service information to provide the service information to the another vehicle may include filtering, by the server, personal information from the speech information and collecting information, and generating, by the server, the service information by using the collected information.

The collecting of the information may include collecting information in consideration of at least one of a frequency number of utterances of the speech information and a weight corresponding to association with the automatic wake-up context.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
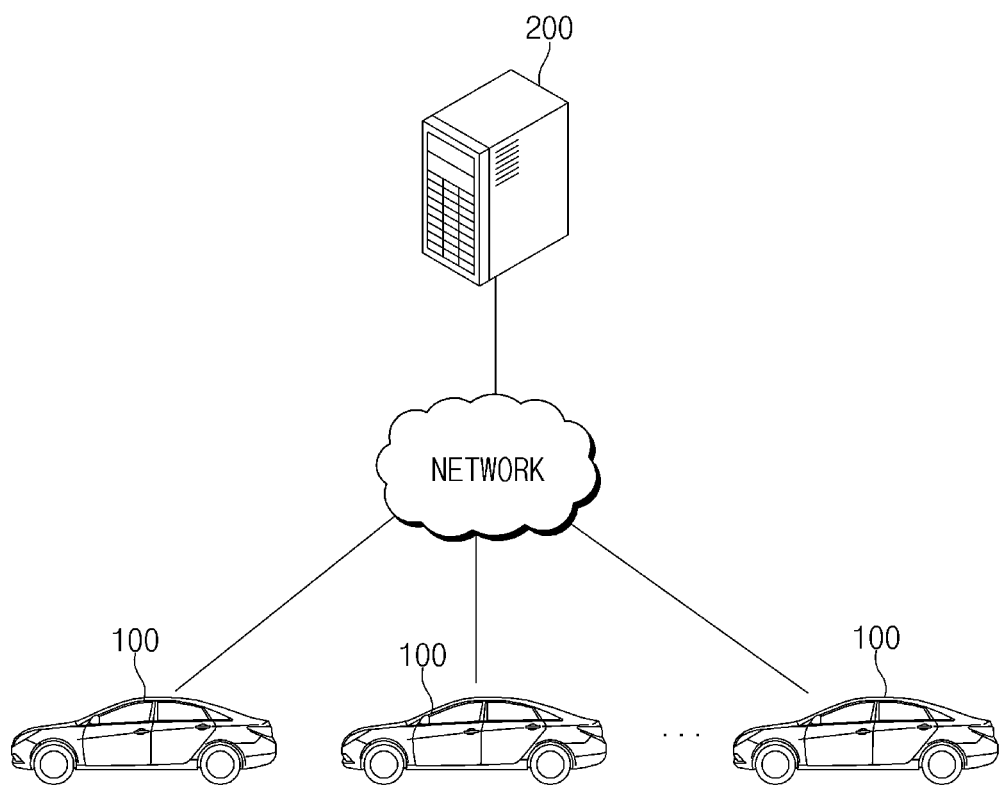
FIG. 1 is a view illustrating a system for providing information based on speech recognition in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

According to the present disclosure, the automatic wake-up context of a speech recognition function based on the driving environment (e.g., a specific situation, geographical position, a specific area condition, and the like) of a vehicle and/or vehicle information. When a user utters a specified automatic wake-up context, the speech recognition function may be automatically activated to collect speech information, that is, data, such that data selected based on the automatic wake-up context and data directed to the user may be obtained.

In addition, according to the present disclosure, a voice recording right may be provided only to a user who desires to share information. Personal information (information related to privacy) and/or contents irrelevant to the speech recognition automatic wake-up context may be removed from the data (speech information) obtained through recording and categorized to provide only the information in which an amount of the same contents is increased, thereby preventing personal information from being exposed.

In addition, according to the present disclosure, when the relevance of speech message data is high, data may be visualized on a vehicle display in a text form in consideration of a weight, a frequency, and the like, so that information may be obtained more simply and easily.

Figure 2:
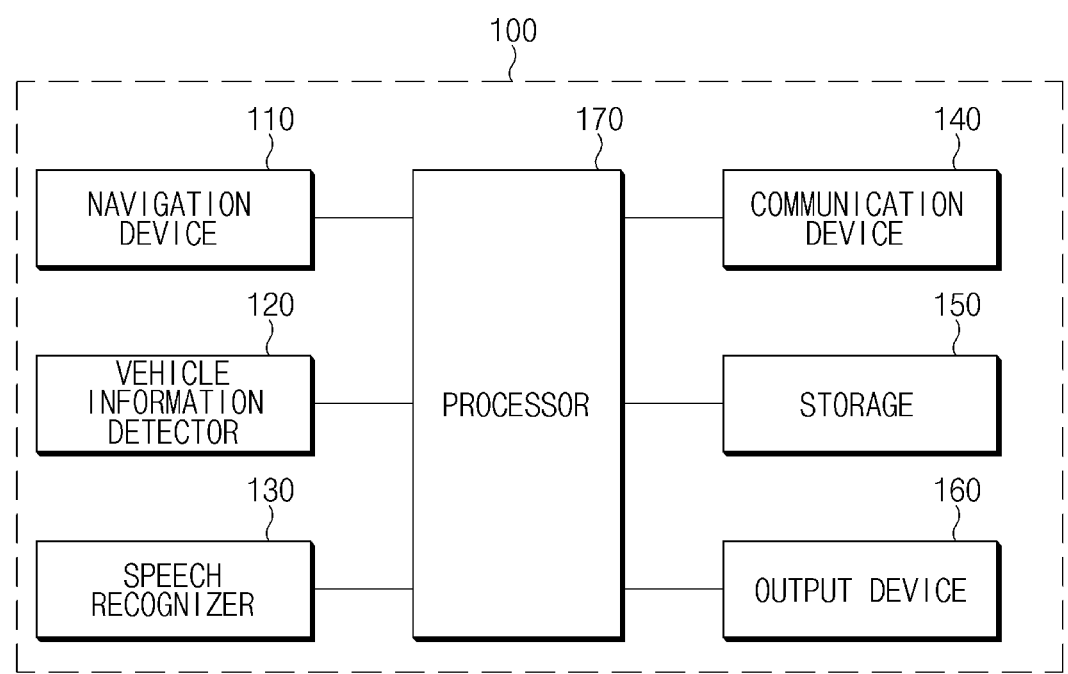
FIG. 2 is a block diagram of the vehicle shown in FIG. 1.
Figure 3:
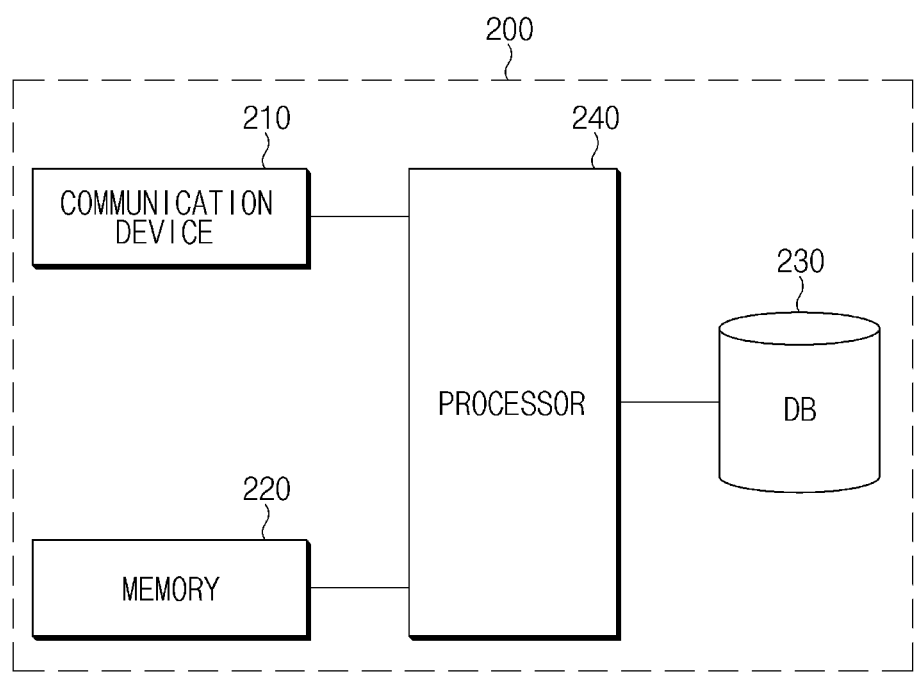
FIG. 3 is a block diagram of the server shown in FIG. 1.

FIG. 1 is a view illustrating a system for providing information based on speech recognition in some forms of the present disclosure. FIG. 2 is a block diagram of the vehicle shown in FIG. 1. FIG. 3 is a block diagram of the server shown in FIG. 1.

Referring to FIG. 1, an information providing system includes a vehicle 100 and a server 200 connected through a network. The network may be implemented with wireless Internet technology, short-range communication technology, mobile communication technology, or the like. In this case, wireless LAN (WLAN: Wi-Fi), a wireless broadband (Wibro), world interoperability for microwave access (Wimax), and the like may be used as the wireless Internet technology. Bluetooth, near field communication (NFC), radio frequency identification (RFID), infrared data association (IrDA), ultra-wideband (UWB), ZigBee and the like may be used as the short-range communication technology. As the mobile communication technology, code division multiple access (CDMA), global system for mobile communication (GSM), long term evolution (LTE), LTE-advanced, international mobile telecommunication (IMT)-2020, and the like may be used.

The vehicle 100 includes a navigation device 110, a vehicle information detector 120, a speech recognizer 130, a communication device 140, storage 150, an output device 160, and a processor 170.

The navigation device 110 may provide navigation information, that is, driving environment information of a vehicle, such as a current location of the vehicle 100, real-time road information, landmark information, a point of interest (POI), weather information, traffic information, charging state information, and the like. The navigation device 110 may use at least one or more of positioning technologies such as a global positioning system (GPS), dead reckoning (DR), a differential GPS (DGPS), and a carrier phase differential GPS (CDGPS) to obtain current location information of the vehicle 100. In addition, the navigation device 110 may obtain real-time traffic information, real-time road information, weather information, and the like from a traffic center through a network.

The vehicle information detector 120 detects vehicle information such as vehicle speed information (e.g., a low or high speed) and state information (e.g., a stop or driving state). The vehicle information detector 120 may detect the vehicle information by using sensors mounted on the vehicle 100, such as a speed sensor and/or a shift lever position sensor.

The speech recognizer 130 obtains speech information (utterance information) through at least one microphone (not shown) installed in the vehicle 100. When a speech signal generated by a vehicle occupant (e.g., a driver and/or a passenger) is input, the speech recognizer 130 processes the speech signal to convert the speech signal into text. In this case, a microphone (not shown) is a sound sensor that receives an external acoustic signal and converts it into an electrical signal. A variety of noise removal algorithms may be implemented in the microphone to remove the noise that is input together with an acoustic signal. In other words, the microphone may remove the noise generated during driving or the noise from an outside from the acoustic signal input from an outside and output the processed acoustic signal.

In some forms of the present disclosure, because the speech recognizer 130 may recognize speech data (speech information) uttered by the user by using at least one of various known speech recognition techniques, the details will be omitted.

The communication device 140 enables the vehicle 100 to access to a network. The communication device 140 may allow the vehicle 100 to exchange data with the server 200. The communication device 140 may be implemented with a wireless Internet technology, a short-range communication technology, a mobile communication technology, a vehicle-to-everything (V2X) technology, and the like. As the V2X technology, vehicle-to-vehicle (V2V), vehicle-to-Infrastructure (V2I), vehicle-to-nomadic devices (V2N), in-vehicle network (IVN), and the like may be applied.

The storage 150 may store software programmed to allow the processor 170 to perform a predetermined operation. The storage 150 may be implemented with at least one of recording mediums such as a flash memory, a hard disk, a secure digital (SD) card, a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, and the like.

The storage 150 may store the driving environment information and the vehicle information of the vehicle obtained by the navigation device 110 and the vehicle information detector 120. The storage 150 may store information received through the communication device 140. In addition, the storage 150 may store an automatic wake-up context for an unexpected situation such as "accident", "119", "injury", "failure", and the like.

The output device 160 outputs the progress status and the result of the operation of the processor 170 in the form of time information, auditory information, tactile information, and the like. The output device 160 may include a display, an audio output module, a tactile information output module, and the like. The display may be implemented with at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen, a cluster, and the like. The audio output module may output the audio data stored in the storage 150. The audio output module may include a receiver, a speaker, a buzzer, and the like. The tactile information output module outputs a signal in a form that the user can perceive with a tactile sense. For example, the tactile information output module may be implemented as a vibrator to control vibration intensity and pattern.

The processor 170, which controls the overall operation of the vehicle 100, may be implemented with at least one of an application specific integrated circuit (ASIC), a digital signal processor (DSP), a programmable logic device (PLD), field programmable gate arrays (FPGAs), a central processing unit (CPU), a microcontroller, a microprocessor, and the like.

The processor 170 obtains (collects) the driving environment information and/or the vehicle information of the vehicle through the navigation device 110 and the vehicle information detector 120 while the vehicle 100 is driven. The processor 170 determines whether to activate the speech recognition function based on the driving environment information and/or the vehicle information. For example, the processor 170 determines activation of the speech recognition function when the congestion state of the road on which the vehicle 100 is traveling is identified through the real-time road information provided from the navigation device 110. Meanwhile, the processor 170 determines the activation of the speech recognition function when the vehicle information detector 120 identifies that the vehicle 100 is in a low-speed state or a stationary state. When the information provided from the navigation device 110 and the information provided from the vehicle information detector 120 do not correspond to each other, for example, it is identified that the driving road of the vehicle 100 is in a congestion state based on the real-time road information provided from the navigation device 110, but the driving speed of the vehicle 100 is actually high, the processor 170 determines the activation of the speech recognition function.

The processor 170 activates the speech recognition function when it is determined to activate the speech recognition function. That is, the processor 170 executes the speech recognizer 130.

In addition, when it is determined to activate the speech recognition function, the processor 170 requests, from the server 200 through the communication device 140, the automatic wake-up context used to determine the start time of information collection using speech recognition. The processor 170 transmits a request message for the automatic wake-up context, which includes the driving environment information and the vehicle information of the vehicle.

The processor 170 receives the automatic wake-up context based on the driving environment information and the vehicle information of the vehicle, which is transmitted from the server 200 through the communication device 140. The processor 170 stores the received automatic wake-up context in the storage 150.

The processor 170 compares the speech information obtained through the speech recognizer 130 with the automatic wake-up context stored in the storage 150 to determine whether to start to collect the speech information.

The processor 170 obtains the speech information through the speech recognizer 130 and stores the obtained speech information in the storage 150 when the obtained speech information matches the stored automatic wake-up context. That is, the processor 170 collects the speech information obtained through the speech recognizer 130 after the point of time when the automatic wake-up context, that is, an automatic wake-up context keyword is uttered by the user. The processor 170 transmits the collected speech information to the server 200. The processor 170 collects only speech information including the automatic wake-up context and transmits it to the server 200.

The processor 170 transmits the current location information of the vehicle 100 to the server 200 through the communication device 140. Thereafter, the processor 170 receives the service information associated with the current location information from the server 200. The processor 170 outputs the service information provided from the server 200 to the output device 160. For example, the processor 170 receives the service information transmitted from the server 200 and displays the received service information on the display in the vehicle 100.

The server 200 provides the automatic wake-up context in response to the request of the vehicle 100 and collects the speech information transmitted from one or more vehicles 100 to provide service information (processed information). The server 200 includes a communication device 210, a memory 220, a database (DB) 230, and a processor 240.

The communication device 210 enables the server 200 to exchange data with the vehicle 100. The communication device 210 performs data communication by using wireless Internet technology, short-range communication technology, mobile communication technology, or the like.

The memory 220 stores software programmed to allow the processor 240 to perform a specified operation. The memory 220 may store data input to the processor 240 and data output from the processor 240. In addition, the memory 220 may store information received through the communication device 210.

The memory 220 may be implemented with at least one of recording mediums such as a flash memory, a hard disk, a secure digital (SD) card, a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and the like.

The DB 230 stores and manages the automatic wake-up context based on the driving environment information and/or the vehicle information of the vehicle. The automatic wake-up context may include an automatic wake-up context keyword for each point-of-interest (POI), an automatic wake-up context keyword defined in advance based on the driving environment information and/or the vehicle information, an automatic wake-up context keyword for an unexpected situation, and the like. The DB 230 may store and manage the valid information collected by the processor 240.

The processor 240 receives a message of requesting the automatic wake-up context transmitted from the vehicle 100 through the communication device 210. The processor 240 searches the DB 230 for the automatic wake-up context, that is, an automatic wake-up context keyword, based on the driving environment information and the vehicle information included in the request message. The processor 240 transmits the detected automatic wake-up context to the vehicle 100.

The processor 240 receives the speech information transmitted from the vehicles 100 through the communication device 210 and stores the speech information in the memory 220. When storing the speech information collected through the vehicles 100, the processor 240 stores geographical information, that is, the location information of the vehicle 100 providing the speech information.

The processor 240 determines whether the received speech information is usable information. In other words, processor 240 determines whether the received speech information is associated with the automatic wake-up context and includes personal information (e.g., name, age, resident registration number, mobile number, email address, and the like). The processor 240 determines that the speech information is valid when the received speech information is associated to the automatic wake-up context and does not include the personal information. Meanwhile, the processor 240 determines that the corresponding speech information is invalid when the received speech information is not associated with the automatic wake-up context or includes personal information.

The processor 240 filters the personal information and/or the speech information that is not associated with the automatic wake-up context from the collected speech information. In addition, the processor 240 extracts relevant data, that is, speech information, based on the current location information of the vehicle 100 and the information pre-stored in the DB 230. The processor 240 extracts a frequently occurring data ranking based on to the frequency of utterances stored in the DB 230. The processor 240 weights more to relevant data and reflect it in the rankings. The processor 240 continually updates and materializes the higher ranking data information.

For example, when the data ranking corresponding to the utterance frequency is as following Table 1, the processor 240 may reorganize the data ranking by weighting a "parking lot" when the vehicle 100 is located in the parking lot. In this case, when a weight of "150" is given to the "parking lot", the frequency of the "parking lot+full seat" becomes 230 due to the weight, and the data ranking changes to "1".

TABLE 1

| Ranking | Speech information | Frequency |
| --- | --- | --- |
| 1 | Travelling road + Congestion | 200 |
| 2 | People + many | 150 |
| 3 | Parking lot + full seat | 80 |

The processor 240 generates service information by using usable speech information, that is, valid information. The service information is information necessary for the vehicle 100 to travel on the road, and may include road information, accident information, failure information, and the like. As described above, according to the disclosure, the automatic wake-up context may be varied to naturally record user's voice in a specific situation (geographical position, accident/ fault occurrence) by changing the automatic wake-up context (without any operations of pushing a separate speech recognition button by the driver), personal information may be filtered for privacy protection, and up-to-date information about a vehicle traveling in the same area assigning weights may be visually provided by applying a weight.

Figure 4:
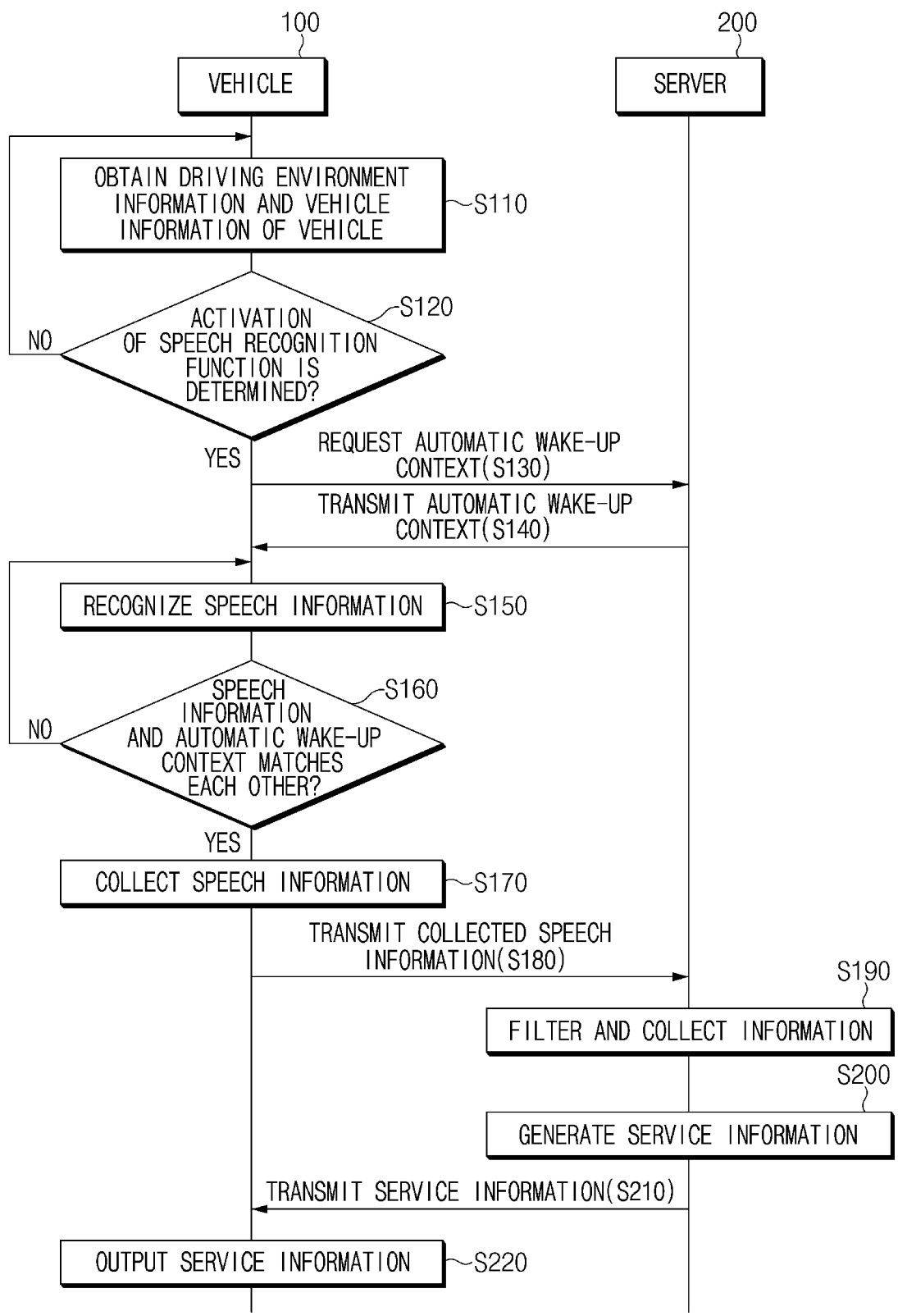
FIG. 4 is a flowchart illustrating a method of providing information based on speech recognition in one form of the present disclosure.

FIG. 4 is a flowchart illustrating a method of providing information based on speech recognition in some forms of the present disclosure.

Referring to FIG. 4, in S110, the vehicle 100 obtains the driving environment information and/or the vehicle information of the vehicle 100. The processor 170 of the vehicle 100 obtains the driving environment information of the vehicle 100 through the navigation device 110 and obtains the vehicle information through the vehicle information detector 120.

In S120, the vehicle 100 determines whether to activate the speech recognition function based on the driving environment information and/or the vehicle information. The vehicle 100 determines the activation of the speech recognition function by identifying the congestion state of the driving road through the real-time road information provided from the navigation device 110. Alternatively, the vehicle 100 determines the activation of the speech recognition function when the vehicle speed information provided from the vehicle information detector 120 is less than a low-speed determination reference. Alternatively, the vehicle 100 determines the activation of the speech recognition function when the information provided from the navigation device 110 and the information provided from the vehicle information detector 120 do not match each other. When the activation of the speech recognition function is determined, the vehicle 100 operates the speech recognizer 130 to activate the speech recognition function.

In S130, when the activation of the speech recognition function is determined, the vehicle 100 requests the server 200 for the automatic wake-up context. The vehicle 100 may transmit the driving environment information and the vehicle information of the vehicle 100 when transmitting a message of requesting the automatic wake-up context.

In S140, the server 200 searches the DB 230 for the automatic wake-up context in response to the request of the vehicle 100 and transmits the information to the vehicle 100. The server 200 may provide, to the vehicle 100, the automatic wake-up context keyword for each point-of-interest (POI), the automatic wake-up context keyword defined in advance based on the driving environment information and/or the vehicle information, the automatic wake-up context keyword for an unexpected situation, and the like.

In S150, the vehicle 100 recognizes the speech information through the speech recognizer 130. The processor 170 of the vehicle 100 recognizes the speech information uttered by a user (e.g., a driver or a passenger) through at least one microphone installed in the vehicle 100.

In S160, the vehicle 100 compares the recognized speech information with the automatic wake-up context provided from the server 200. The vehicle 100 determines whether the recognized speech information matches the automatic wake-up context, that is, the automatic wake-up context keyword.

In S170, when the recognized speech information matches the automatic wake-up context, the vehicle 100 collects the speech information through the speech recognizer 130. The vehicle 100 determines whether to start to collect the speech information according to whether the recognized speech information matches the automatic wake-up context. The vehicle 100 starts to collect the speech information when the recognized speech information matches the automatic wake-up context. In other words, the vehicle 100 obtains the speech information through the speech recognizer 130 and stores the speech information in the storage 150 after the time point when the automatic wake-up context is uttered by the user.

In S180, the vehicle 100 transmits the collected speech information to the server 200. The server 200 receives the speech information transmitted from at least one vehicle 100.

In S190, the server 200 filters and collects the speech information received from the vehicle 100. The server 200 stores and manages the collected information in the DB 230.

In S200, the server 200 generates service information based on the collected information. The server 200 extracts information from the collected information in association with the current location information of the vehicle 100 to generate the service information.

In S210, the server 200 transmits the generated service information to the vehicle 100.

In S220, the vehicle 100 outputs the service information provided from the server 200 in a form recognizable by the user. The vehicle 100 may display the service information on the display or output the service information as a voice message through the speaker.

As described above, when the user utters a sentence containing the automatic wake-up context keyword, the vehicle records the uttered speech information and transmits it to the server 200 together with the current location information of the vehicle 100. When the server 200 receives the current location information from the vehicle 100, the server 200 may extract the association information from the DB 230 in association with the received current location information, and may process the extracted information to provide the processed information to another vehicle. For example, when the server 200 receives the location information from a specific vehicle, the server 200 may generate service information including the occurrence of the accident on the road on which the specific vehicle is traveling, the accident location, and the like in association with the received location information, and provide the service information to the specific vehicle.

Hereinafter, an example of providing information based on speech recognition in some forms of the present disclosure will be described.

First, when it is identified that the vehicle 100 has entered a specific POI, for example, within a radius of 5 km of "Lotte-world®", the vehicle 100 transmits a message of requesting the automatic wake-up context together with the current location information of the vehicle 100 to the server 200. The server 200 searches the DB 230 for keywords, such as "Lotte-world®", "amusement park", "parking", "parking lot", and the like, associated with the specific POI based on the current location information of the vehicle 100. The server 200 provides the detected keyword to the vehicle 100 as the automatic wake-up context.

When the automatic wake-up context provided from the server 200 is uttered by the user, the vehicle 100 obtains the speech information through the speech recognizer 130 after the utterance and transmits the speech information to the server 200. For example, the vehicle 100 obtains "Lotte-world is too crowded today", "the road to Lotte-world is very blocked", "Amusement park always has many people on the weekend", "It takes too much time to go to an amusement park", "There is no place to park", "Parking lot is full", and the like, and transmits it to the server 200.

The vehicle 100 deactivates the speech recognition function when the vehicle 100 is out of the specific POI radius of 5 km. That is, the vehicle 100 stops (ends) the operation of the speech recognizer 130.

Second, when the driving environment information provided from the navigation device 110 and the vehicle information provided from the vehicle information detector 120 do not match each other, the vehicle 100 may activate the speech recognition function regardless of the automatic wake-up context so that speech information may be obtained. For example, according to the traffic information provided from the navigation device 110, when the traveling road is in a congestion state and the vehicle speed obtained through the vehicle information detector 120 is not a low speed traveling of 50 km or less, or according to the weather information provided from the navigation device 110, the driving area is identified as a rainy area, but according to the information obtained by the vehicle information detector 120, when the wiper is not operated for more than one minute, the speech information is obtained through the speech recognizer 130 and is stored.

Meanwhile, the vehicle 100 may receive automatic wake-up context such as "difference", "fault", "weather", "fine", "rain", "traffic", "congestion", "traffic smooth", and the like by requesting the automatic wake-up context from the server 200.

When the user utters the automatic wake-up context, the vehicle 100 obtains, through the speech recognizer 130, uttered information such as "traffic is smooth and not jammed", "it will rain here, but it does not rain", and the like. The vehicle 100 transmits the obtained speech information to the server 200.

The vehicle 100 deactivates the speech recognition function when the driving environment information and the vehicle information match each other or when a specified time elapses.

Thirdly, when the automatic wake-up context related to the unexpected situation pre-stored in the storage 150 is uttered by the user, the vehicle 100 stores (collects) the speech information input through the speech recognizer 130 into the storage 150. The vehicle 100 transmits the speech information obtained through the speech recognizer 130 to the server 200. Meanwhile, when the vehicle 100 enters a specified radius of an accident hazard, the vehicle 100 requests the server 200 to provide automatic wake-up context on the unexpected situation. When the automatic wake-up context is uttered by the user, the vehicle 100 transmits speech information, such as "An accident (trouble) occurs", "There is an ambulance, so an accident occurs", and the like, obtained through speech recognition to the server 200.

When the vehicle 100 uses the automatic wake-up context stored in the storage 150, the speech recognition function may be maintained in an active state until the vehicle operation is terminated. Meanwhile, when the vehicle 100 uses the automatic wake-up context provided from the server 200, the speech recognition function may be deactivated when the vehicle 100 gets out of a specified radius of the accident hazard.

According to the present disclosure, the information is collected based on the speech recognition without any specified operation of the user by changing the context for automatically waking up the speech recognition function based on the driving environment information and/or the vehicle information of the vehicle without any action of the user, so that it is possible to prevent dispersion of attention due to the action of the user during driving.

In addition, according to the present disclosure, information related to privacy is filtered from the collected utterance information and provided to other vehicles, so that it is possible to prevent the information related to privacy from being leaked.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for providing information based on speech recognition, the system comprising:
    a vehicle; and
    a server configured to:
        receive, from the vehicle, a message of requesting an automatic wake-up context of a speech recognition function;
        provide, to the vehicle, the automatic wake-up context based on driving environment information and vehicle information included in the requested message;
        receive, from the vehicle, speech information associated with the automatic wake-up context;
        generate service information by processing the received speech information; and
        provide, to another vehicle, the service information,
    wherein the vehicle is configured to:
        automatically obtain the speech information by using the speech recognition when the automatic wake-up context is uttered, wherein the speech information includes the automatic wake-up context; and
        transmit, to the server, the speech information.

2. The system of claim 1, wherein the server is configured to filter personal information from the speech information.

3. The system of claim 1, wherein the server is configured to generate the service information based on at least one of a utterance frequency of the speech information or a weight corresponding to the automatic wake-up context.

4. A vehicle comprising:
    a navigation device configured to provide driving environment information of the vehicle;
    a vehicle information detector configured to provide vehicle information;
    a speech recognizer configured to recognize speech information in the vehicle; and
    a processor configured to:
    transmit a message of requesting an automatic wake-up context of a speech recognition function to a server, wherein the message includes the driving environment information and the vehicle information;
    obtain speech information associated with the automatic wake-up context based on the driving environment information and the vehicle information provided from the server;
    wherein the speech information includes the automatic wake-up context;
    wherein the processor is configured to determine whether to activate the speech recognizer based on at least one of the driving environment information or the vehicle information; and
    wherein the processor is configured to activate the speech recognizer when the driving environment information is inconsistent with the vehicle information.

5. The vehicle of claim 4, wherein the vehicle further comprises:
    a communication device configured to communicate with a server, wherein the processor is configured to receive, from the server, the automatic wake-up context.

6. The vehicle of claim 5, wherein the processor is configured to determine whether the automatic wake-up context is uttered through the speech recognizer after the speech recognizer is activated.

7. The vehicle of claim 6, wherein the processor is configured to:
obtain the speech information after the automatic wake-up context is uttered; and
transmit, to the server, the speech information.

8. The vehicle of claim 4, wherein the vehicle further comprises:
a storage configured to store the automatic wake-up context based on the driving environment information and the vehicle information.

9. A method of providing information based on speech recognition, the method comprising:
obtaining, by a vehicle, driving environment information and vehicle information;
transmitting, by the vehicle, a message of requesting an automatic wake-up context of a speech recognition function to a server, wherein the message includes the driving environment information and the vehicle information;
obtaining, by the vehicle, speech information associated with the automatic wake-up context based on the driving environment information and the vehicle information provided from the server;
transmitting, by the vehicle, the speech information to the server;
generating, by the server, service information by processing the speech information; and
providing, by the server, the service information to another vehicle,
wherein the speech information includes the automatic wake-up context.

10. The method of claim 9, wherein obtaining the driving environment information and the vehicle information comprises:
obtaining, by a navigation device of the vehicle, the driving environment information including at least one of current location information, real-time road information or weather information; and
obtaining, by a plurality of sensors of the vehicle, the vehicle information including at least one of vehicle speed information or state information.

11. The method of claim 9, wherein obtaining the speech information comprises:
determining, by the vehicle, an activation of the speech recognition function based on the driving environment information and the vehicle information;
sensing, by the vehicle, utterance of the automatic wake-up context after the speech recognition function is activated; and
obtaining and storing, by the vehicle, speech information after the automatic wake-up context is uttered.

12. The method of claim 11, wherein determining the activation of the speech recognition function comprises:
determining the activation of the speech recognition function when a road on which the vehicle travels is identified as a congested state based on the driving environment information.

13. The method of claim 11, wherein determining the activation of the speech recognition function comprises:
determining the activation of the speech recognition function when the vehicle is identified as a low-speed state or a stationary state based on the vehicle information.

14. The method of claim 11, wherein determining the activation of the speech recognition function comprises:
determining the activation of the speech recognition function when the driving environment information is inconsistent with the vehicle information.

15. The method of claim 11, wherein the method further comprises:
requesting, by the vehicle, the automatic wake-up context from the server; and
providing, by the server, the automatic wake-up context to the vehicle based on the driving environment information and the vehicle information.

16. The method of claim 11, wherein sensing the utterance of the automatic wake-up context comprises:
obtaining, by the vehicle, speech information uttered by a user in the vehicle;
comparing the speech information with the automatic wake-up context; and
determining whether the automatic wake-up context is uttered based on a comparison result.

17. The method of claim 9, wherein generating the service information comprises:
collecting, by the server, information by filtering personal information from the speech information; and
generating, by the server, the service information based on the collected information.

18. The method of claim 17, wherein collecting the information comprises:
collecting the information based on at least one of a utterance frequency of the speech information or a weight corresponding to the automatic wake-up context.

* * * * *